United States Patent [19]

Hienerwadel et al.

[11] Patent Number: 4,941,053
[45] Date of Patent: Jul. 10, 1990

[54] PREDICTIVE ENCODER FOR STILL PICTURES

[75] Inventors: Klaus Hienerwadel; Gerald Weth, both of Nuremberg, Fed. Rep. of Germany

[73] Assignee: U.S. Philips Corp., New York, N.Y.

[21] Appl. No.: 333,484

[22] Filed: Apr. 5, 1989

[30] Foreign Application Priority Data

Apr. 6, 1988 [DE] Fed. Rep. of Germany ....... 3811536

[51] Int. Cl.⁵ ............................................. H04N 1/417
[52] U.S. Cl. .................................. 358/261.2; 358/133
[58] Field of Search ............................. 358/133, 261.2

[56] References Cited

U.S. PATENT DOCUMENTS 4,344,086  8/1982  Mizuno ........................... 358/261.2
4,698,672  10/1987 Chen ............................... 358/261.2
4,825,285  4/1989  Speidel ............................ 358/133

FOREIGN PATENT DOCUMENTS 3613343 10/1987 Fed. Rep. of Germany .

Primary Examiner—Howard W. Britton
Attorney, Agent, or Firm—Emmanuel J. Lobato

[57] ABSTRACT

A predictive encoder for still pictures comprises a quantizer (Q) whose characteristic curve is variable. The encoded picture data are read and transmitted at a constant bit rate from an output memory (PMUX). A subtractor (SR) and a picture memory (BS) are used for obtaining prediction values. In order to be able to transmit the still pictures from a video camera without any noticeable loss of quality, a first frame memory (V1) is provided in which the data of all pixels of the still picture to be transmitted are stored. A selection circuit (AS) adjusts the characteristic curve after the quantizer (Q) performs the quantizing operation. If the data stored in the first frame memory (V1) are transmitted several times, the selection circuit (AS) selects, for each encoding and transmission operation, a characteristic curve corresponding to a more refined quantizing operation than the characteristic curve which was used for the previous encoding and transmission operation.

3 Claims, 2 Drawing Sheets

PREDICTIVE ENCODER FOR STILL PICTURES

BACKGROUND OF THE INVENTION

The invention relates to a predictive encoder for still pictures, comprising a quantizer whose characteristic curve is variable, an output buffer from which the encoded picture data are read and transmitted at a constant bit rate, and a subtractor and a picture memory for obtaining prediction values.

A hybrid encoder for video signals is known from DE 36 13 343 A1 and corresponding U.S. Pat. No. 4,825,285 in which the data of a video picture are subdivided into equally large data blocks by means of a preprocessing unit. Each data block comprises the data of a square picture section of 64 pixels. For example, a data block may comprise the chrominance values of the first 8 pixels of the first 8 lines of a video picture. The preprocessing unit also assigns an identification to each data block, which indicates the position of the block within a video picture. Data blocks of successive video pictures having the same identification are designated as corresponding data blocks. A subtractor compares each data block with the corresponding data block of the previous video picture. The corresponding data block of the previous video picture is present at the output of a first picture memory. The difference block produced by the subtractor is subjected in a first operation unit to a matrix transform (the data blocks are treated as square number matrixes). This transform is eliminated in a feedback path by a second operation unit and the regained difference block is applied to a first input of an adder. The second input of the adder is connected to the output of the first picture memory, while the output of the adder is connected to the data input of the first picture memory.

The main object of the known encoder is to encode the video data from a video data source with a minimum possible loss of information into a signal with a minimum possible bit rate. In this process two encoding principles are used, hence the name hybrid encoder: the interframe principle in which the correlation (by block differentiation) between time-sequential video pictures (used in this respect for frames and fields) is utilized and the intraframe principle in which the correlation of the video data (by the matrix transform) within a video picture is utilized.

The known arrangement is specially designed for the transmission of so-called moving pictures, thus of sequences of video pictures comprising data which are different from picture to picture because the imaged objects move relative to the video camera. To reduce the transmission bit rate, for example to 2 Mbit/s, the abovementioned preprocessing unit also comprises a device for sub-sampling the video pictures supplied by a video camera. These video pictures comprise 556 lines and 720 columns, i.e. 400320 pixels. After the sub-sampling operation the number of pixels amounts to only a quarter of the original number of pixels. This automatically results in a loss of quality of the video pictures supplied by a video camera.

SUMMARY OF THE INVENTION

It is an object of the invention to provide a still picture encoder of the type described in the opening paragraph, while starting from the known moving picture encoder, in which independent of the transmission bit rate the still pictures supplied by a video camera can be transmitted without any noticeable loss of quality.

This object is realised by the following means: a first frame memory in which the data of all pixels of the still picture to be transmitted are stored, a selection circuit adjusting the characteristic curve after the quantizer performs the quantizing operation, at least an encoding and transmission of all data stored in the first frame memory, while for each further encoding and transmission the selection circuit selects a characteristic curve corresponding to a more refined quantizing operation.

An advantageous embodiment for the case in which only fields of the still picture stored in the first frame memory can be stored in the first picture memory is provided by a first selection unit which reads predetermined fields of the overall picture from the first frame memory in a predetermined sequence for the purpose of encoding and transmission, while a second selection unit is provided which reads the prediction values of a field from the picture memory, writes them in a second frame memory and transfers the prediction values of the next field from this memory to the picture memory.

BRIEF DESCRIPTION OF THE DRAWINGS

An embodiment of the invention will now be described in greater detail with reference to the accompanying drawing in which.

DETAILED DESCRIPTION OF THE INVENTION

Figure 1:
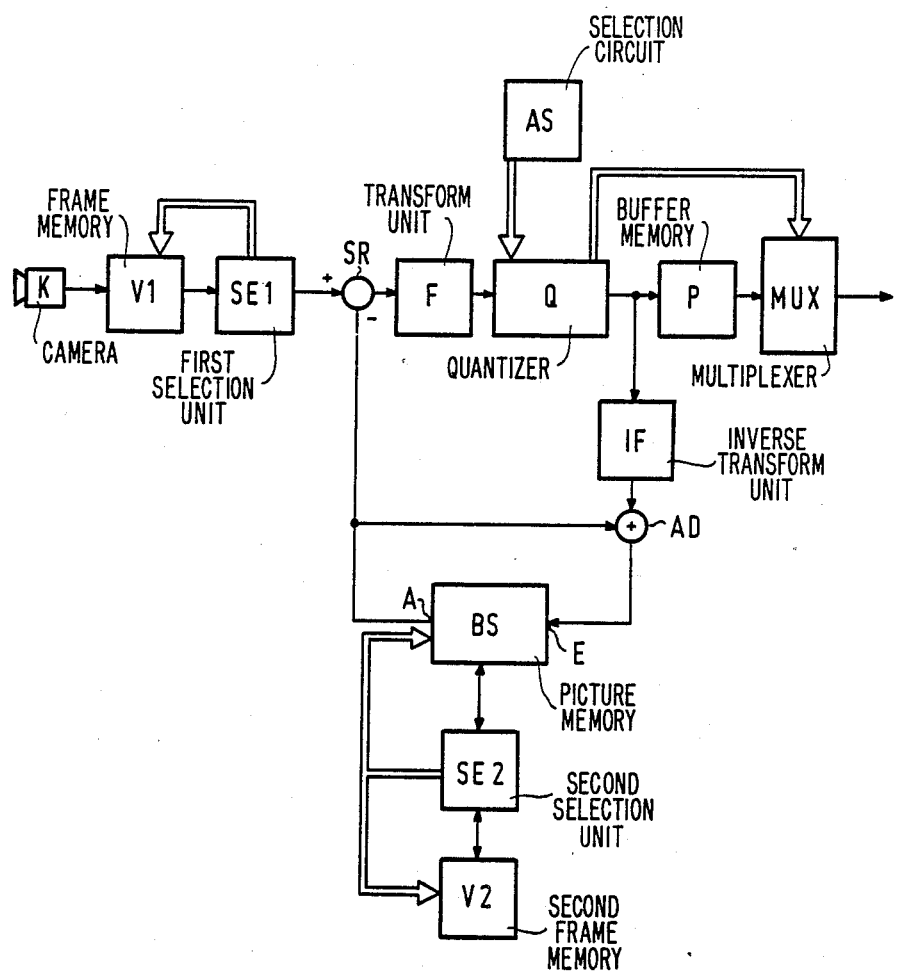
FIG. 1 shows the basic circuit diagram of a still picture encoder having the characteristic features according to the invention and FIG. 2 shows the basic circuit diagram of a still picture decoder according to the invention.

In the encoder shown in FIG. 1 a still picture, i.e. a picture in which the imaged objects are stationary relative to a camera K, is picked up with 556 lines and 720 columns per picture and the data of all 400320 pixels are stored in a frame memory V1. With the aid of a selection unit SE1 predetermined fields of the frame are read block-wise from this frame memory V1, the predetermined fields each time covering a quarter of the overall picture. Also the sequence in which the fields are read is predetermined. In the relevant embodiment the sequence is one in which the quadrants of a cartesian system of coordinates are enumerated in the conventional manner.

Each quarter picture is encoded block-wise by means of further components of the still picture encoder, namely a subtractor SR, a transform unit F, a quantizer Q, an output buffer comprising a buffer memory P and a multiplexer MUX as well as an inverse transform unit IF, an adder AD and a picture memory BS and this encoded picture is processed into a channel signal having a constant bit rate.

Before transmitting the first quarter picture, the picture store BS, whose capacity is exactly sufficient for a quarter picture in the relevant case, has been erased. Consequently, the prediction values, which are applied from an output A of the picture memory BS to the subtractor SR, consist of zeros only. As a result, the unchanged blocks transmitted by the selection unit SE1 appear at the output of the subtractor SR. These blocks are applied to the transform unit F. The unit F performs a Fourier transform on these blocks (cf. DE 36 13 343 A1) and transfers the transformed blocks to the quantizer Q. When a quarter picture is transmitted for the first time, a selection circuit AS controls the quantizer Q in such a way that it works with a quantizing characteristic curve corresponding to the coarsest quantization available. The transformed and quantized blocks are then written in a buffer memory P, read from this memory at a different rate and combined into a channel signal having a constant bit rate by the multiplexer MUX together with other so-called side information, for example information indicating the adjustment of the quantizer Q.

The quantized signal is also applied to the inverse transform unit IF which eliminates the operation of the unit F. The same applies to the subtractor SR and the adder AD (for further details cf. DE 36 13 343 A1) and to a unit (not shown) in the feedback path and to the quantizer Q.

The blocks written via an input E of the picture memory BS and read at the output A are the prediction values for the second transmission of the quarter pictures. However, when the first quarter picture has been transmitted, the prediction values stored in the memory BS are transferred by a further selection unit SE2 to a further frame memory V2 and simultaneously the prediction values of the second quarter picture are transferred from the frame memory V2 to the picture memory BS. Parallel thereto, the selection unit SE1 reads blocks of the second quarter picture from the frame memory V1.

Once all four quarter pictures have been transmitted, the next transmission of the picture stored in the frame memory V1 is effected for each quarter picture, but with a more refined quantizing characteristic curve. At the receiver end the still picture is thus built up from quarter pictures in accordance with the encoding process and with each new transmission a better picture quality is achieved due to the more refined quantization. The transmission of the still picture is terminated after the transmission with the most refined quantizing characteristic curve has been effected or if the receiver has terminated the transmission at the receiver end because of an adequate quality.

If the buffer memory P should overflow during encoding of a quarter picture, the encoding process is interrupted—similarly as in the transmission of moving pictures—and the encoding of the same quarter picture is continued after one tenth of a second (reciprocal value of the picture frequency), but at the position where the encoding process during the previous transmission has been interrupted.

Figure 2:
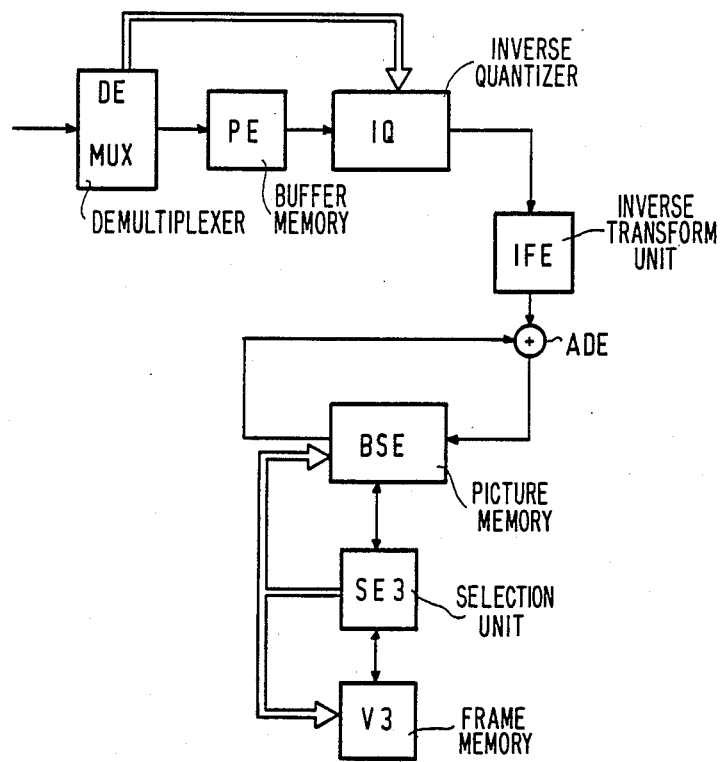

The transmission of still picture does not require any changes at the receiver end in the known hybrid decoder (cf. DE 36 13 343 A1), in so far as the capacity of the picture memory BS is sufficient for storing a frame in the sense described. Otherwise, the decoder should be changed in a similar way as the encoder. This will be explained with reference to FIG. 2.

Before the decoding operation the transmitted signal is read into an input buffer comprising a demultiplexer DEMUX and a buffer memory PE. Side information is separated from the transmitted overall information by the demultiplexer DEMUX, for example the adjustment of the quantizer at the transmitter end. This side information is applied to an inverse quantizer unit IQ which eliminates the operation of the quantizer Q at the transmitter end in so far as it generates numbers from its input data which have the same representation as the input data of the quantizer Q at the transmitter end.

An inverse transform unit IFE operating similarly as the unit IF at the transmitter end succeeds the unit IQ. After the inverse transform the transmitted data are applied to an input of an adder ADE whose output is connected to the input of a picture memory BSE at the receiver end. Its output is connected to the other input of the adder ADE. The transmitted frame is stored in quarter pictures in the memory BSE. When the transmission of a quarter picture has ended, the data of this quarter picture are written by means of a selection unit SE3 into a frame memory V3 at the receiver end and simultaneously the data hitherto transmitted of the next quarter picture are transferred from the frame memory V3 to the picture memory BSE. The transmitted data are available for the receiver in the frame memory V3 for their visualization on a display screen.

We claim:

1. A predictive encoder for still pictures, comprising: a quantizer whose characteristic curve is variable, an output buffer from which the encoded picture date are read and transmitted at a constant bit rate, and a subtractor and a picture memory for obtaining prediction values, characterized by;
    a first frame memory in which the data of all pixels of the still picture to be transmitted are stored,
    a selection circuit adjusting the characteristic curve after the quantizer performs the quantizing operation,
    at least an initial encoding and transmission of all data stored in the first frame memory occurring, and for each further encoding and transmission the selection circuit selecting a characteristic curve corresponding to a more refined quantizing operation.

2. A predictive encoder for still pictures as claimed in claim 1, characterized in that for the case in which only fields of the still picture stored in the first frame memory can be stored in the picture memory, a first selection unit is provided which reads predetermined fields of the entire picture from the first frame memory in a predetermined sequence for the purpose of encoding and transmission, and in that a second selection unit is provided which reads the prediction values of a field from the picture memory, writes them in a second frame memory and transfers the prediction values of the next field from the second frame memory to the picture memory.

3. A still picture decoder, for a predictive encoder for still pictures as claimed in claim 2, comprising: a picture memory and a third frame memory at the receiver end, and a third selection unit which reads transmitted fields from the picture memory at the receiver end and writes them in the third frame memory, and from which it transfers the already transmitted data of the next field to the picture memory at the receiver end.

* * * * *